Oct. 21, 1947.  W. ROMANIK  2,429,371
AGRICULTURAL MACHINE FOR HARVESTING SPINACH
Filed Aug. 26, 1943  3 Sheets-Sheet 1
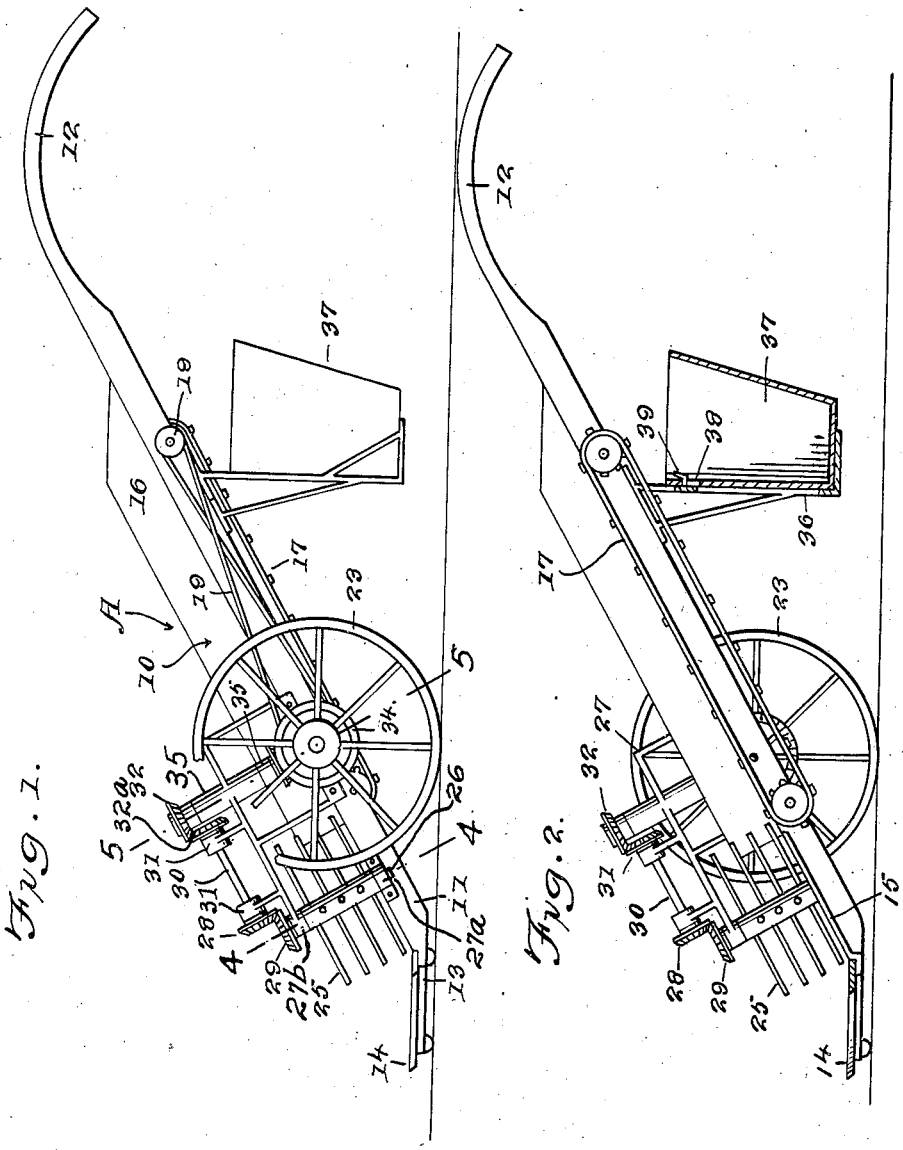
INVENTOR.
William Romanik
BY
Victor J. Evans & Co.
ATTORNEYS Oct. 21, 1947.  W. ROMANIK  2,429,371
AGRICULTURAL MACHINE FOR HARVESTING SPINACH
Filed Aug. 26, 1943  3 Sheets-Sheet 2
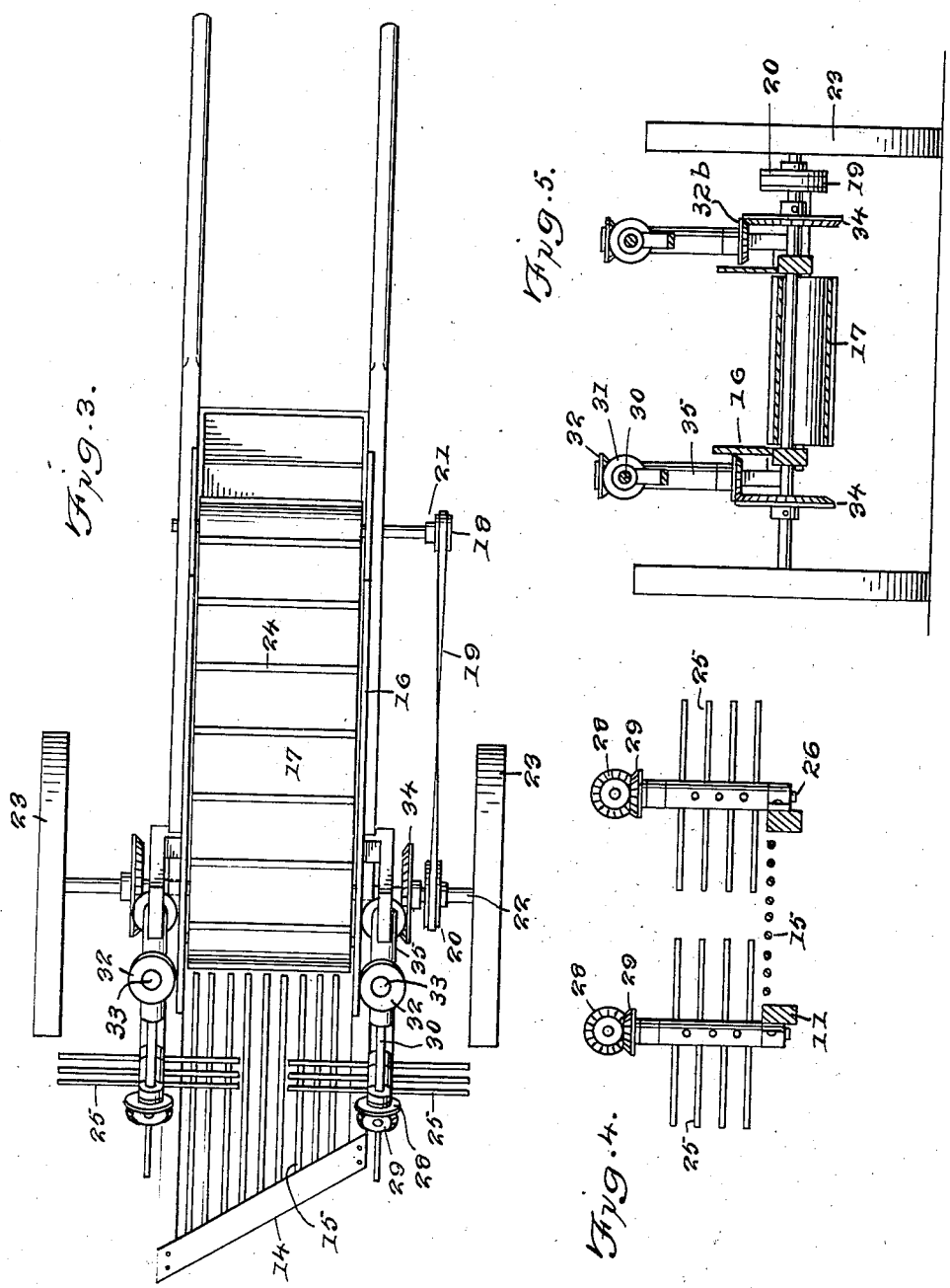
INVENTOR.
William Romanik
BY
Victor J. Evans & Co.
ATTORNEYS

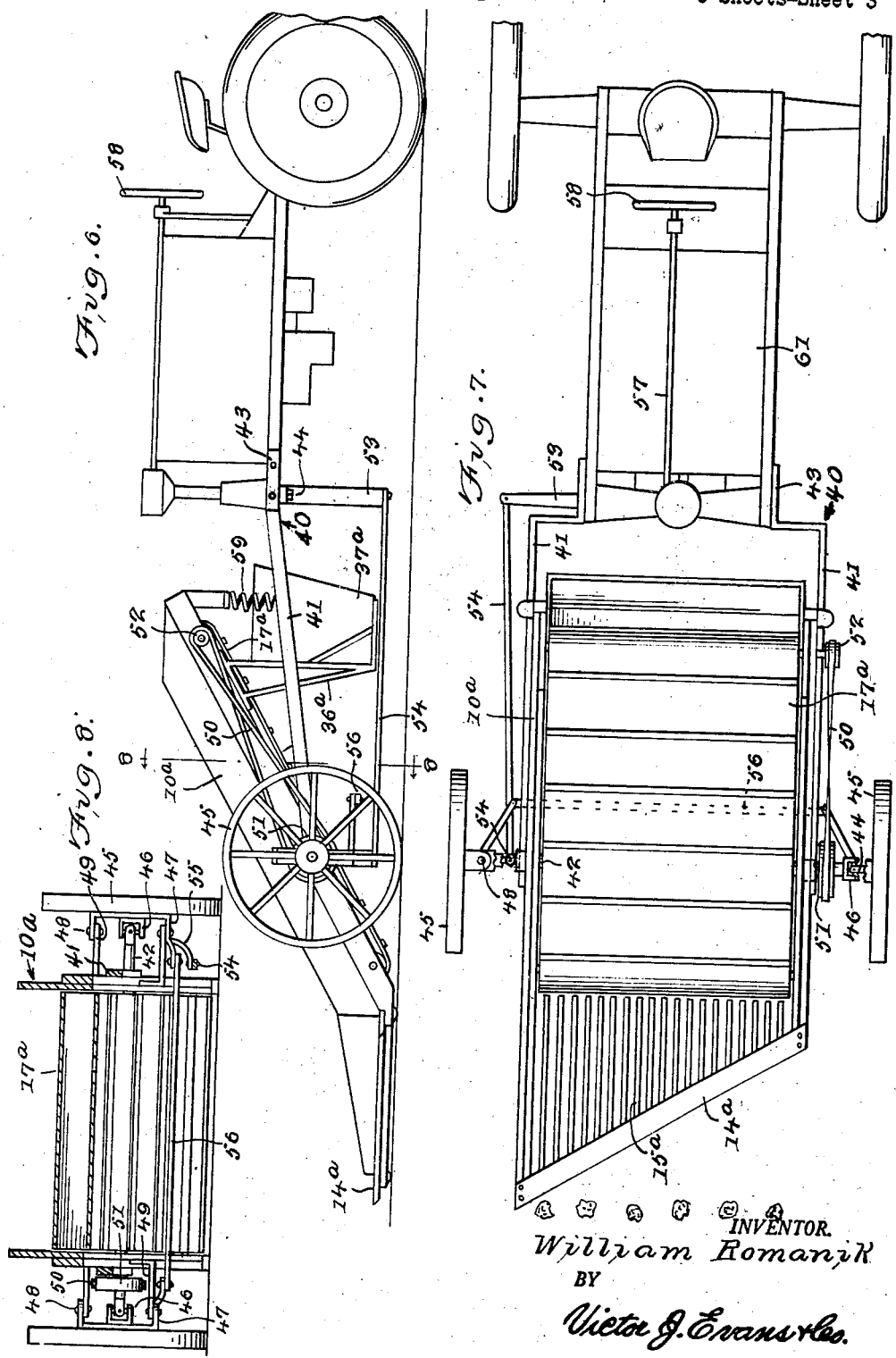

Patented Oct. 21, 1947

2,429,371

UNITED STATES PATENT OFFICE 2,429,371

AGRICULTURAL MACHINE FOR HARVESTING SPINACH

William Romanik, Millville, N. J.

Application August 26, 1943, Serial No. 500,123

1 Claim. (Cl. 56—327)

The invention relates to an agricultural machine and more particularly to spinach harvesters.

The primary object of the invention is the provision of a machine of this character, wherein growing spinach can be conveniently and quickly harvested, the machine being hand or motor power driven and is novel in construction.

Another object of the invention is the provision of a machine of this character, wherein the cut crop is delivered to a collector, the latter being unloaded at will, and is conveniently carried by the machine, which is advanced through a field or garden.

A further object of the invention is the provision of a machine of this character, which is comparatively simple in construction, readily and easily handled, thoroughly reliable and efficient in operation, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 1 is a side elevation of the machine constructed in accordance with the invention.

Figure 2 is a longitudinal sectional view thereof.

Figure 3 is a top plan view.

Figure 4 is a sectional view taken on the line 4—4 of Figure 1.

Figure 5 is a sectional view taken on the line 5—5 of Figure 1.

Figure 6 is a side view of a modified form.

Figure 7 is a top plan view of the same, and

Figure 8 is a sectional view taken on the vertical plane indicated by the line 8—8 of Figure 6.

Similar reference characters indicate corresponding parts throughout the several views in the drawings.

Referring to the drawings in detail, that is to say, Figures 1 to 5, inclusive, A designates generally the machine in its entirety as constructed in accordance with the invention.

The machine A comprises a forwardly inclined two-wheeled body 10 having side sills 11 which terminate at the rear thereof in push handles 12, while the forward ends carry a front cutter platform 13, which is horizontally disposed and is equipped with a diagonally arranged cutter blade 14 fore thereof. The platform 13 includes longitudinally disposed spaced supporting bars 15, and the body 10 is fitted with side boards 16, while located between said sills 11 within the body 10 is an endless forwardly inclined elevator apron 17 driven from a power shaft 18 and a driving belt 19 which is trained over belt wheels 20 and 21, respectively. The belt wheel 20 is fixed to the axle 22 for the traction wheels 23 of the machine, while the belt wheel 21 is fixed to the shaft 18, which is journaled in the sills 11 of the body 10. This apron 17 is provided cross slats 24 as usual.

Rotary gatherers 25 are located at opposite sides of the bars 15 between the cutter blade 14 and the lower end of the apron 17. The gatherers 25 are carried by shafts 26 which are journaled in bearings 27a carried by the side sills 11 and bearings 27b carried by brackets 27. The brackets 27 are also secured to the side sills 11, and carry bearings 31 for shafts 30 and bearings 35 for shafts 33. The shafts 30 are arranged at right angles to the shafts 26, and carry beveled gears 28 meshing with beveled gears 29 carried by the upper ends of the shafts 26. The shafts 33 are arranged at right angles to the shafts 30 and are provided at their upper ends with beveled gears 32 meshing with beveled gears 32a on the shafts 30. The shafts 33 are provided at their lower ends with beveled gears 32b which mesh with beveled gears 34 on the axle 22. The shafts 33 and 30, and their gears, together with the gears 34, establish a driving connection between the axle 22 and the shafts of the gatherers 25, whereby the gatherers are rotated in a direction to throw the cut material onto the bars 15 and lower end of the apron 17.

Arranged on the body 10 at the delivery end of the apron 17 and depending from the sills 11 is a collector rack 36 for a collector 37 open at its top. This collector is provided with a keeper slot 38 in which engages a stationary hook-like keeper 39 on the rack 36, so that the collector 37 is detachably held on the rack 36 in receiving position, but can be unloaded at will.

In Figures 6, 7 and 8 of the drawing is shown a modified form of the machine. In this form of the machine the body 10a, cutter blade 14a, fingers 15a and elevator apron 17a are similar to the corresponding parts of the machine shown in Figures 1 through 5. This form of the machine is also provided with a rack 36a and collector receptacle 37a. It is not, however, provided with the gatherers 25 and the operating mechanism therefor.

The modified form of the machine is adapted to be driven by a tractor of any well known or appropriate construction, and it is connected to a tractor after the removal of the front wheels of the latter. The body 10ᵃ of the machine is connected to the tractor by a frame 40 which has its side bars 41 connected to the axle 42 of the machine and connected to the sides of the tractor as at 43. The spindles 44 carrying the wheels 45 of the machine, are connected by universal joints 46 to the axle 42 so as to permit the wheels to be turned to effect the steering of the machine and tractor. Brackets 47 mounted loosely on the spindles 46 are pivoted, as at 48 to arms 49 fixed rigidly to the sides of the body 10ᵃ. The elevator 17ᵃ is driven from the axle 42 by a belt 50 passing about pulleys 51 and 52 fixed respectively to the axle and to the shaft of the top roller of the conveyor. The wheels 45 are connected to the steering mechanism of the tractor by an arm 53 and a link 54, the latter being connected to an arm 55 fixed to one of the brackets 47. The brackets are connected together by a tie rod 56. The steering mechanism of the tractor includes a steering rod 57 and wheel 58.

The body 10ᵃ is pivotally supported by the axle 42 and is yieldingly supported to normal position by springs 59 mounted between the upper end of the body and the side bars 41 fixed to the tractor and loosely connected to the axle 42. As stated, the tractor 61 is of conventional construction. To adapt it for propelling the machine it is only necessary to remove its front wheels and attach the frame 40 and the steering arm 53 to the tractor.

The machine is advanced through a field of growing spinach and the latter is cut and conveyed by the elevator apron for delivery into the collector. This collector is unloaded at will by hand.

The gatherers during the advancement of the machine will deposit the cut spinach onto the apron, the flow of spinach being between the gatherers which rotate toward each other as the machine is advanced through a field or in a garden of growing spinach.

The bars 15 of the platform 13 serve as a sieve for ridding the cut spinach of dirt and foreign matter during the harvesting thereof.

It is, of course, understood that changes, variations and modifications may be made in the invention as fall properly within the scope of the appended claim, without departing from the spirit of the invention or sacrificing any of its advantages.

What is claimed is:

In a harvesting machine, a wheel-supported axle, an elongated frame pivoted between its ends on the axle, cutting and conveyor mechanisms carried by the frame, rotary gatherers located at opposite sides of the frame between the cutting and conveyor mechanisms, brackets secured to opposite sides of the frame rearwardly of the gatherers, bearings carried by the frame and brackets for rotatably supporting the gatherers, shafts geared to the gatherers, shafts geared to the axle and said first shafts, and bearings carried by the frame for supporting said shafts.

WILLIAM ROMANIK.

REFERENCES CITED

The following references are of record in the file of this patent:

UNITED STATES PATENTS

| Number | Name | Date |
| --- | --- | --- |
| 414,842 | McDonald | Nov. 12, 1889 |
| 515,802 | Storey | Mar. 6, 1894 |
| 875,831 | Longstreet | Jan. 7, 1908 |
| 796,268 | Troeger | Aug. 1, 1905 |
| 1,808,928 | Lint | June 9, 1931 |
| 1,099,495 | Frederickson et al. | June 9, 1914 |
| 1,714,851 | Dean | May 28, 1929 |
| 1,758,555 | Bettex et al. | May 13, 1930 |
| 1,853,109 | Anderson | Apr. 12, 1932 |

FOREIGN PATENTS

| Number | Country | Date |
| --- | --- | --- |
| 217,656 | Great Britain | June 23, 1924 |